(12) United States Patent
Sargent et al.

(10) Patent No.: US 10,506,763 B2
(45) Date of Patent: Dec. 17, 2019

(54) APPARATUS FOR SPLITTING BALES AND RETAINING WRAP

(71) Applicant: Tie Down, Inc., Atlanta, GA (US)

(72) Inventors: Kenneth A. Sargent, Villa Rica, GA (US); Warren van Nus, Lawrenceville, GA (US)

(73) Assignee: Tie Down, Inc., Atlanta, GA (US)

( * ) Notice: Subject to any disclaimer, the term of this patent is extended or adjusted under 35 U.S.C. 154(b) by 616 days.

(21) Appl. No.: 15/233,626

(22) Filed: Aug. 10, 2016

(65) Prior Publication Data

US 2017/0042094 A1 Feb. 16, 2017

Related U.S. Application Data

(60) Provisional application No. 62/203,796, filed on Aug. 11, 2015.

(51) Int. Cl.
| | |
|---|---|
| *A01F 29/00* | (2006.01) |
| *B26D 1/08* | (2006.01) |
| *B26D 7/01* | (2006.01) |
| *A01D 87/12* | (2006.01) |
| *A01F 29/02* | (2006.01) |
| *A01F 29/08* | (2006.01) |
| *B26D 1/38* | (2006.01) |

(52) U.S. Cl.
CPC .......... *A01F 29/005* (2013.01); *A01D 87/127* (2013.01); *A01F 29/00* (2013.01); *A01F 29/02* (2013.01); *A01F 29/08* (2013.01); *B26D 1/08* (2013.01); *B26D 1/38* (2013.01); *B26D 7/01* (2013.01); *A01D 2087/128* (2013.01)

(58) Field of Classification Search
CPC ........ A01F 29/005; A01F 29/02; A01F 29/08; A01F 29/01; A01D 87/127
USPC ........................................................ 241/605
See application file for complete search history.

(56) References Cited

U.S. PATENT DOCUMENTS

| | | |
|---|---|---|
| 3,612,127 A | 10/1971 | Benno |
| 4,411,573 A | 10/1983 | Townsend |
| | (Continued) | |

OTHER PUBLICATIONS

Tanco Autowrap; Brochure for 170 Bale Shear, publicly available prior to Aug. 11, 2015, 2 pgs.

(Continued)

*Primary Examiner* — Faye Francis
(74) *Attorney, Agent, or Firm* — Taylor English Duma LLP (57) ABSTRACT

An apparatus for splitting bales and retaining wrap includes a frame having an interior framework oriented at an angle relative to forwardly-projecting tines, the framework and tines together defining an upwardly-opening cradle that supports and centers a bale of forage bound with a wrap above an inverted apex of the cradle. The apparatus also includes an elongate hooking mechanism extending laterally across the underside of the wrapped bale and configured to capture the wrap together with a thin layer of forage, and an elongate blade rotatably supported on the frame and configured to rotate downward through the bale toward the inverted apex of the cradle. The apparatus further includes a first actuation device that activates the hooking mechanism to capture the wrap and layer of forage, and one or more second actuation devices that rotate the elongate blade downward through the forage to split the bale.

16 Claims, 7 Drawing Sheets

(56) References Cited

U.S. PATENT DOCUMENTS

| | | | |
|---|---|---|---|
| 4,449,672 A * | 5/1984 | Morlock | A01D 87/127 241/101.76 |
| 4,497,163 A | 2/1985 | Ogman | |
| 4,549,481 A | 10/1985 | Groeneveld et al. | |
| 4,597,703 A | 7/1986 | Bartolini | |
| 4,771,670 A | 9/1988 | Woerman | |
| 4,923,128 A * | 5/1990 | Ostrowski | A01F 29/005 241/101.742 |
| 4,996,899 A * | 3/1991 | Henderson | A01D 87/127 29/564.3 |
| 5,033,683 A | 7/1991 | Taylor | |
| 5,161,448 A | 11/1992 | Wangsness | |
| 5,242,121 A | 9/1993 | Neier | |
| 5,542,326 A | 8/1996 | Borgford | |
| 5,544,822 A | 8/1996 | Neier | |
| 5,957,025 A | 9/1999 | Buckmaster et al. | |
| 7,377,457 B2 | 5/2008 | Schierman | |
| 7,967,231 B2 | 6/2011 | Post et al. | |
| 8,528,843 B2 | 9/2013 | Murphy | |
| 2008/0041989 A1* | 2/2008 | Schierman | A01D 87/127 241/101.72 |
| 2013/0193247 A1 | 8/2013 | Graham | |
| 2018/0016049 A1 | 1/2018 | Schmitz et al. | |
| 2018/0220586 A1 | 8/2018 | Van Nus et al. | |

OTHER PUBLICATIONS

Tanco Autowrap; Brochure for 173 Bale Shear, publicly available prior to Aug. 11, 2015, 2 pgs.

* cited by examiner

APPARATUS FOR SPLITTING BALES AND RETAINING WRAP

CROSS-REFERENCE TO RELATED APPLICATIONS

This application claims the benefit of U.S. Provisional Patent Application No. 62/203,796, filed on 11 Aug. 2015, and entitled "APPARATUS FOR SPLTITING BALES AND RETAINING WRAP," which application is incorporated by reference in its entirety herein, and for all purposes.

FIELD OF THE INVENTION

The present invention generally relates to an apparatus for splitting wrapped cylindrical bales of forage material, and particularly to an apparatus that retains the wrap during the splitting process to separate the loose forage material from the wrap.

SUMMARY

Briefly described, one embodiment of the present disclosure comprises an apparatus for splitting bales and retaining wrap that includes a frame having an interior framework orientated at an obtuse angle relative to a plurality of forwardly-projecting tines, with the interior framework and tines together defining an upwardly-opening cradle that supports and centers a bale of forage bound with a wrap above the inverted apex of the cradle. The apparatus also includes an elongate hooking mechanism extending laterally across the underside of the bale and configured to capture the wrap together with a thin layer of forage, as well as an elongate blade that is rotatably supported on the frame and configured to rotate downward through the bale of forage toward the inverted apex of the cradle. The apparatus further includes a first actuation device that activates the hooking mechanism to capture the wrap and layer of forage and a second actuation device that rotates the elongate blade downward through the forage to split the bale.

Another embodiment of the disclosure comprises an apparatus for splitting wrapped bales of forage and retaining wrap that includes a rotatable frame having an interior framework oriented at an angle relative to a plurality of tines projecting forwardly from the frame, with the frame being rotated to an angular position with the interior framework and tines together defining an upwardly-opening cradle that supports and centers a bale of forage bound with a wrap above an inverted apex of the cradle. The apparatus also includes an elongate hooking mechanism extending laterally across the length of the underside of the bale and configured to capture the wrap together with a thin layer of forage along the length of the bale, as well as an elongate blade that is rotatably supported on the frame and configured to rotate downward through the bale toward the inverted apex of the cradle. The apparatus further includes a first actuation device that activates the elongate hooking mechanism to capture the wrap and the thin layer of forage, and a second actuation device that rotates the elongate blade downward to cut through the forage and split the bale.

Another embodiment of the disclosure includes a method for splitting bales of forage and retaining wrap that includes positioning a bale of forage bound with a wrap above the inverted apex of an upwardly-opening cradle, the cradle being defined by an interior framework of a frame and a plurality of tines projecting forwardly from a leading edge of the frame and oriented at an obtuse angle relative to the interior framework. The method also includes activating an elongate hooking mechanism extending laterally across the underside of the bale to capture the wrap together with a thin layer of forage. The method further includes rotating an elongate cutting blade downward through the bale toward the inverted apex of the cradle to cut through the forage and split the bale, and then tilting the frame forward to dump the cut interior forage onto a ground surface while retaining the wrap and thin layer of forage within the elongate hooking mechanism.

The invention will be better understood upon review of the detailed description set forth below taken in conjunction with the accompanying drawing figures, which are briefly described as follows.

Those skilled in the art will appreciate and understand that, according to common practice, various features and elements of the drawings described above are not necessarily drawn to scale, and that the dimensions and relative positions between the features or elements may be expanded, reduced or otherwise altered to more clearly illustrate the various embodiments of the present disclosure depicted therein.

DETAILED DESCRIPTION

The following description, in conjunction with the accompanying drawings described above, is provided as an enabling teaching of exemplary embodiments of a an apparatus and method for splitting bales of forage covered in a wrap while simultaneously retaining and removing the wrap from the loose forage. As described below, the apparatus and method can provide several significant advantages and benefits over methods and/or equipment that are currently used to split wrapped bales of forage. The recited advantages are not meant to be limiting in any way, however, as one skilled in the art will appreciate that other advantages may also be realized upon practicing the present disclosure.

Furthermore, those skilled in the relevant art will recognize that changes can be made to the described embodiments while still obtaining the beneficial results. It will also be apparent that some of the advantages and benefits of the described embodiments can be obtained by selecting some of the features of the embodiments without utilizing other features, and that features from one embodiment may be combined with features from other embodiments in any appropriate combination. For example, any individual or collective features of method embodiments may be applied to apparatus, product or system embodiments, and vice versa. Accordingly, those who work in the art will recognize that many modifications and adaptations to the embodiments described are possible and may even be desirable in certain circumstances, and are a part of the disclosure. Thus, the present disclosure is provided as an illustration of the principles of the embodiments and not in limitation thereof, since the scope of the invention is to be defined by the claims.

Referring now in more detail to the drawing figures, wherein like parts are identified with like reference numerals throughout the several views, FIGS. 1-8 illustrate one embodiment of an apparatus 10 for splitting wrapped bales of forage, such as hay, alfalfa, or similar plant products used as animal feed. As first shown in FIGS. 1-4, the bale splitting apparatus 10, also known as a bale splitter, generally includes a frame 20 having a forward end 22 that is open to receive the wrapped bale, a back end 26 having a rear framework adapted for attachment to a lift vehicle (not shown), sides defined by two side frames 24, and a width 21 between the two side frames 24 that is sufficient to receive the length of the wrapped bale. In one aspect each of the side frames 24 can comprise two vertical plates 23 that are rigidly connected together with bracing while spaced apart from one other to form a narrow compartment 25 that is configured to receive the powered actuation device 62 of a powering system. The inner plates of the side frames can therefore separate and protect the actuation device 62 from incidental and potentially-damaging contact with the wrapped bale.

Figure 7:
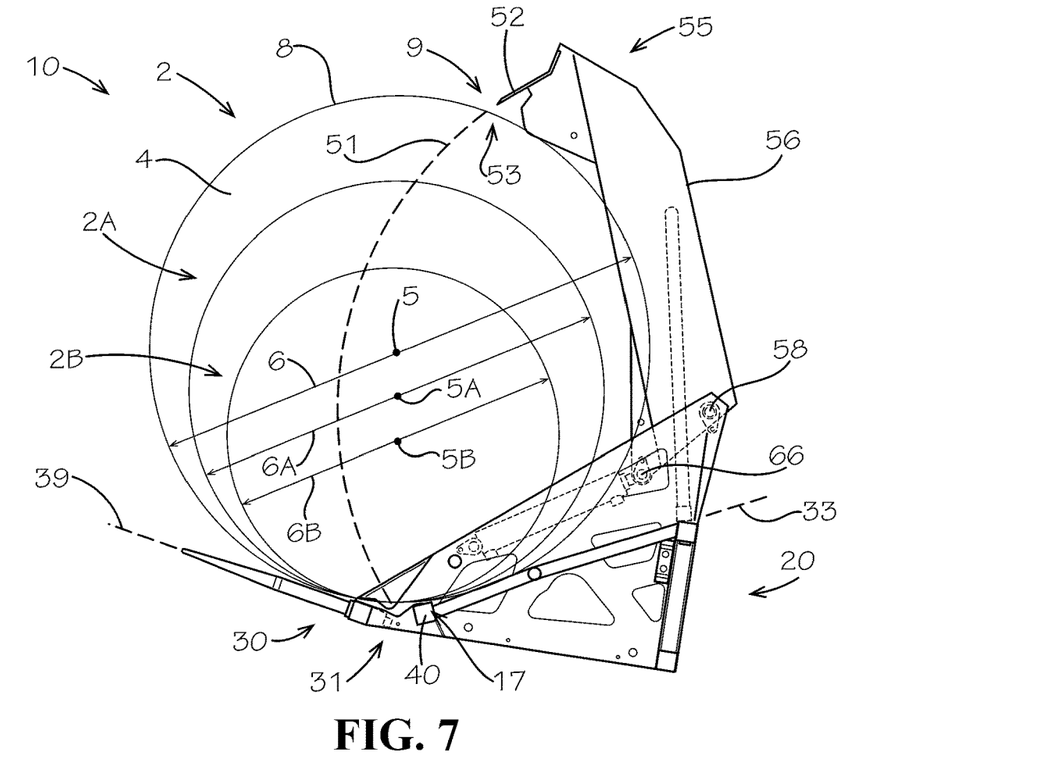
FIG. 7 is a side view of the bale splitter apparatus of FIG. 1 illustrating the capability for receiving and splitting differently-sized cylindrical bales and the path of the cutting blade therethrough.

Although the wrapped bales are generally shown in FIG. 7 as being cylindrical bales 2 of forage 4 having a diameter 6 and a length (extending into the paper) along a longitudinal center axis 5, it will be appreciated that the bale splitter 10 is not limited in use to cylindrical bales, and can also find application with square or rectangular bales. The bales 2 are generally bound with a cover or wrap 8, such as nylon netting or a plastic sheet, that holds together the forage 4 and maintains the shape of the bale 2 during transportation and storage. The wrapped bales are then loaded into the bale splitter 10 with the length or center axis 5 of the bale being aligned with the width 21 of the frame 20.

The frame 20 can further include an inner framework 32 between the interior vertical plates 23 of the two side frames 24 that defines an inner support plane 33, and a plurality of spears or tines 38 that project forwardly from a front tube 36 to define an outer support plane 39. The outer support plane 39 can be oriented at an obtuse angle 37 (FIG. 3) relative to the inner support plane 33 to form a shallow, upward-opening cradle 30 that is adapted to support and center the bale of forage above the inverted apex 31 of the cradle 30. The obtuse angle 37 can be greater than or about 130 degrees so as to reduce the internal compression of the forage created by the rotatable cutting arm 50 as it moves downward through the bale during the cutting process, and in a preferred embodiment can be greater than or about 145 degrees.

A hook tube 40 can be positioned at the lower end of the inner framework 32 and spaced from the front tube 36, so as to form a center gap 34 between the hook tube 40 and the front tube 36, with the center gap 34 being positioned proximate the inverted apex 31 of the cradle. As described in more detail below, the hook tube 40 can include an elongate hooking mechanism enclosed therein comprising a plurality of hooks that sweep upward through apertures 43 formed through the top plate 42 of the hook tube 40 to hook into both the wrap 8 and a thin layer of forage 4 at multiple locations along the length of the underside of the bale. It has been discovered by the inventors that capturing a portion of the forage 4 together with the wrap 8, particularly along a substantial or majority portion of the length of the bale 2, can better secure and retain the wrap 8 to the frame 20 as the bale 2 is split and the forage dumped onto a ground surface.

When a wrapped bale 2 is loaded into the frame 20 of the bale splitter 10 and the frame tilted backwards slightly to center the bale 2 within the cradle 30, as shown in FIG. 7, in one embodiment the hook tube 40 can be angularly aligned with the center axis 5 of the bale at about the 5:30 o'clock position and the front tube can be angularly aligned at about the 6:30 o'clock position (as viewed from the right-hand side of the bale splitter apparatus 10 when facing the open, forward end 22 of the apparatus 10). Nevertheless, it will be appreciated that the hook tube 40 and the front tube 36 can be positioned at a variety of different angular positions when supporting a wrapped bale, depending on the construction of the frame 20, the size of the bale 2, and the overall angular orientation or tilt of the bale splitting apparatus 10. For instance, it has been determined that the hooking mechanism and hook tube can continue to effectively capture the wrap and the thin layer of forage with the frame 20 being tilted forward or backward up to about ten degrees from the vertically centered position shown in FIGS. 3-4.

The bale splitter 10 also includes a rotatable cutting arm 50 that generally comprises an elongate blade 52 secured to a blade support 54 that extends between the blade ends 55 of two pivot arms 56. In the embodiment of the bale splitter 10 shown in FIG. 1, the elongate cutting blade 52 can be formed with a serrated cutting edge 53 having a plurality of points across the length thereof. The points pierce first through the wrap and into the bale so that the trailing diagonal edges cut through the forage while effectively sliding across the forage at an angle as they are moved downward through the bale. This can generate a more effective and efficient cutting motion that reduces the power requirements for splitting the bale. In one aspect the elongate cutting blade 52 can also be formed from separate blade segments with triangular tips that are aligned together and mounted side-by-side to the blade support 54 to form the assembled elongate cutting blade 52. This can allow for the independent removal of each blade segment so that the diagonal edges can be sharpened along their entire lengths from the points clear through to the root portions where the segments contact one another.

Figure 2:
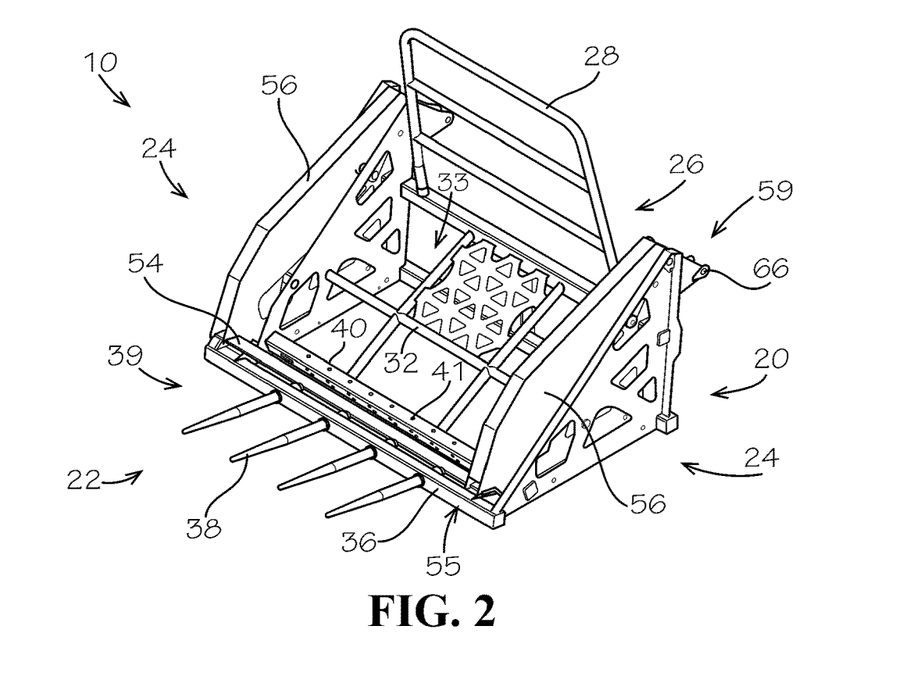
FIG. 2 is a perspective view of the bale splitter apparatus of FIG. 1 with the cutting arm in a closed position.
Figure 3:
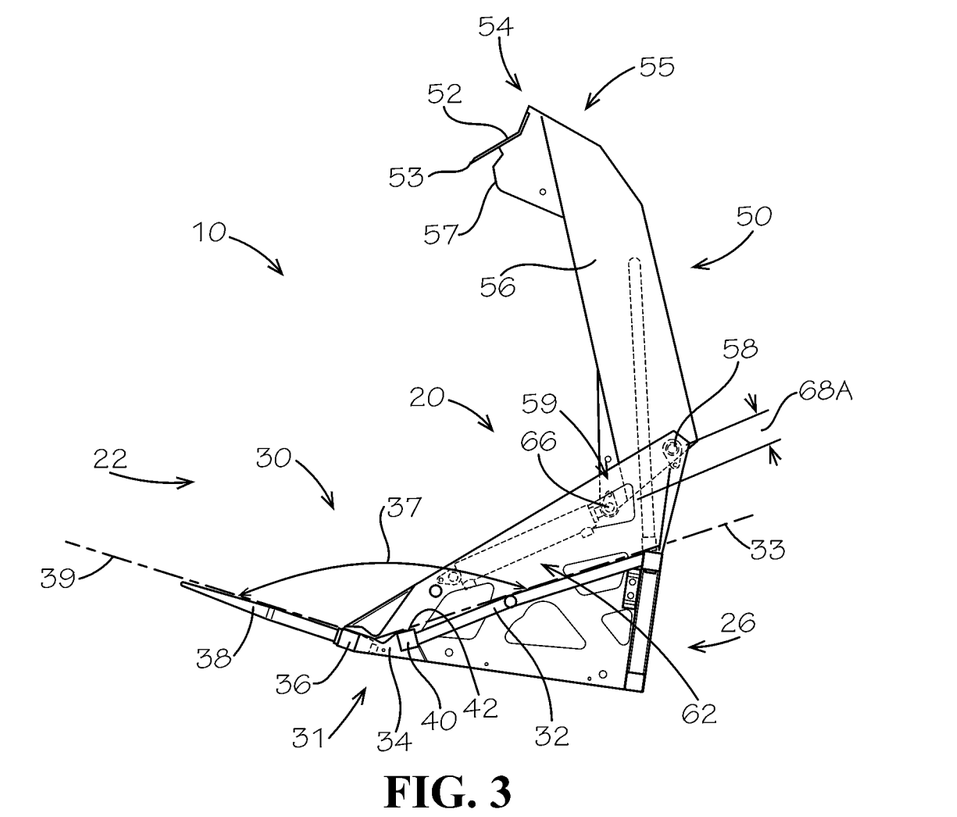
FIG. 3 is a side view of the bale splitter apparatus of FIG. 1, without the vertical plates of the right hand side frame, and with the cutting arm in an open position.
Figure 4:
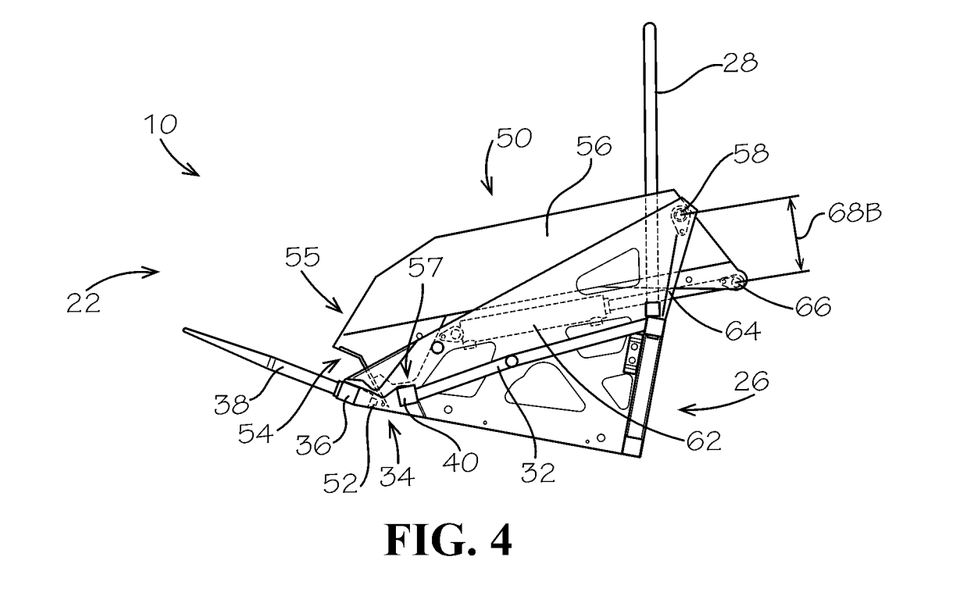
FIG. 4 is a side view of the bale splitter apparatus of FIG. 1, without the vertical plates of the right hand side frame, and with the cutting arm in a closed position.

The pivot arms 56 can be rotatably mounted to opposite sides of the frame 20 with bearings or pivot supports 58 located near the upper corners of the side frames 24. The pivot arms 56 can also comprise framed structures, and in one aspect can be configured to nest within the compartments 25 of the side frames 24 as they reached the closed position, so that the elongate blade 52 projecting downward from the blade ends 55 of the pivot arms 56 can extend into the gap 34 between the front tube 36 and the hook tube 40. As best seen in FIGS. 2 and 4, in one embodiment the pivot arms 56 can include lever portions that extend a distance away from the pivot supports 58 to lever ends 59 that are pinned to the distal ends 66 of the drive pistons 64 of the powered actuation devices 62, such as the hydraulically-operated power cylinders of a hydraulic powering system. As described in more detail below, the lever portions of the pivot arms 56 can be configured to provide the actuation devices 62 with an increased mechanical advantage for cutting the bales of forage.

While only the power cylinders 62 of the powering system are shown in the drawings, it will be appreciated by the skilled artisan that a hydraulic powering system will generally include both a source of pressurized fluid, such as a pump or compressor, and possibly a pressurized fluid holding tank, as well as the appropriate control valves and fluid transfer lines that direct the pressurized fluid to the power cylinders 62. As known in the art, the pressurized fluid source and control components of the powering system will generally be located on the lift vehicle that supports and manipulates bale splitter 10, with fluid communication being established by fluid transfer lines that extend between the lift vehicle and the powered actuation devices 62 on the bale splitter 10. However, it is contemplated that in some aspects the pressurized fluid source and control components could also be mounted directly to the frame 20 of the bale splitter 10. It will also be appreciated that other types of powering systems for driving the rotatable cutting arm 50, including but not limited to pneumatic, electric, and/or geared drive systems, and the like, are also possible and considered to fall within the scope of the present disclosure.

Power cylinders 62 can be located within the narrow compartments 25 of each side frame 24, so as to simultaneously apply a substantially equivalent force to the lever ends 59 of both pivot arms 56. When the powering system is activated (FIGS. 2, 4), the drive pistons 64 within the power cylinders 62 can push outwardly on the lever ends 59 of the pivot arms 56, thereby causing the cutting arm 50 to rotate and the elongate blade 52 to move downward toward the closed position, cutting first through the wrap on the upper side of the bale and then cutting through the forage to split the bale. Having the power cylinders 62 simultaneously apply a driving force to both sides of the cutting arm 50 can reduce or substantially eliminate unbalanced forces across the blade support 54 as well undesirable side loadings on the pivot supports 58.

Arranging the power cylinders 62 to push on the lever ends 59 of the pivot arm 56, rather than pull on blade side of the pivot arm 56, can also provide several significant advantages over the other bale splitters known in the art. For example, the length and angle of the lever arm between the pivot supports 58 and the pinned ends 66 of the drive pistons 64 can be readily configured to provide increased leverage, and therefore cutting force, as the elongate blade 52 moves through the more dense portions of forage near the core of the bale. With reference to the right-hand side views of FIGS. 3 and 4, for instance, the orientation of the power cylinder 62 can rotate downward or clockwise during most of the rotation of the cutting arm. This can cause the perpendicular or lever arm distance 68A between the line of force applied by the power cylinder 62 and the pivot support 58 of the cutting arm 50 in the open position (FIG. 3) to increase toward a lever arm distance 68B as the cutting arm 50 moves through the bale. Moreover, depending on the configuration of the lever end 59 of the pivot arm 56 that defines the length and angle of the imaginary line between the pinned end 66 of the drive piston 64 and the pivot support 58, in one aspect the largest lever arm distance, and the greatest leverage or mechanical advantage, can occur as the elongate blade 52 moves through the center portion of the bale, and then decrease slightly as the cutting arm 50 reaches the closed position (FIG. 4).

Another advantage for arranging the power cylinders 62 to push on the lever ends 59 of the pivot arm 56 is the ability to streamline both the powering system and the structure of the bale splitter 10. This is because more power can be generated on the proximal end face of the power piston 64 (i.e. the side facing the fixed end of the power cylinder) than on the distal end face, for any given pressure, due to the proximal end face's greater surface area. For instance, for a 3.5" power cylinder 62 having a drive piston 64 with a 1" diameter shaft, placing the hydraulics in a push configuration can provide up to 140% of the force provided in a pull configuration. In turn, this can allow both the size of the power cylinders 62 and the width of the compartments 25 of the side frames 24 that accommodate the power cylinders to be reduced, leading to a decrease in the overall weight and size of the bale splitter 10.

The pivot arms 56 can also be provided with a hard stop feature that abuts or engages the fixed frame 20 of the bale splitter to prevent further rotation of the cutting arm 50 after it reaches its closed position. In the embodiment of the bale splitter 10 illustrated in FIGS. 1-8, for example, the hard stop 57 can be formed into the lower edge portions of the blade end 55 of each pivot arm, and can abut or engage the top plate 42 of the hook tube 40, as best shown in FIG. 4. This arrangement can allow the manufacturer or user to control the position the elongate blade 52 at the end of each cutting stroke, so that the cutting edge 53 of the blade 52 projects into the center gap 34 between the hook tube 40 and the front tube 36 a desired distance. In one aspect the elongate blade 52 can also be adjustably mounted to the blade support 54 so that the end position of the cutting edge 53 within the center gap 34 can be modified to account for differences in the forage, the size of the bale, the wrap material, and the like.

Figure 1:
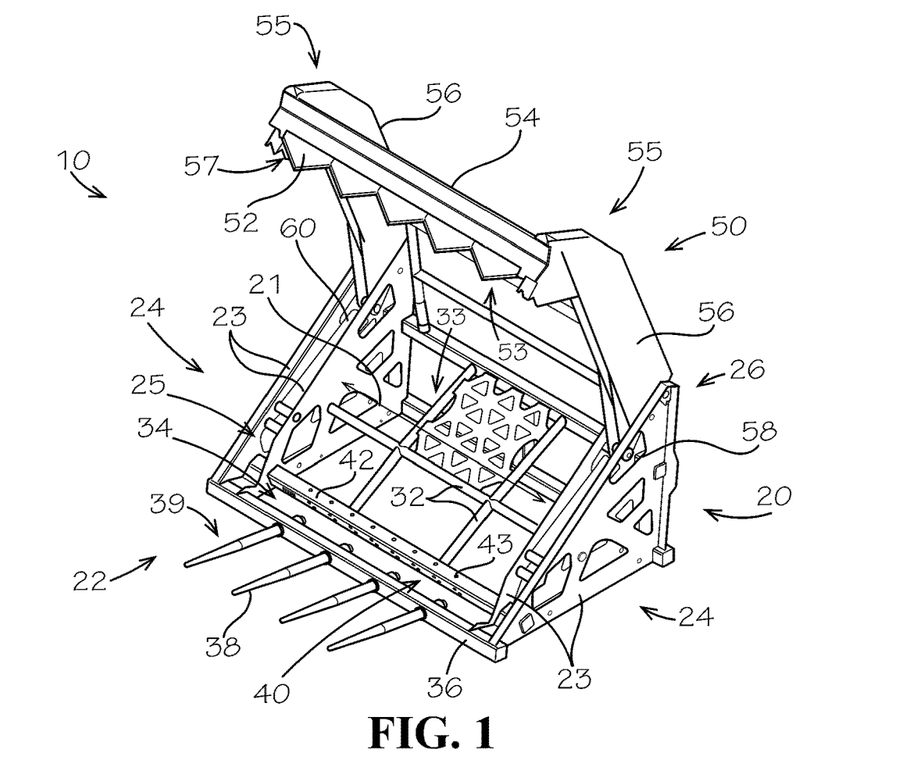
FIG. 1 is a perspective view of a bale splitter apparatus with a cutting arm in an open position, in accordance with a representative embodiment of the present disclosure.

Also visible in FIGS. 2 and 4 is an anti-tip brace 28 that can be mounted to the back end 26 of the frame 20 to extend upward and provide a positive support that prevents the bale from rolling backward out of the bale splitter 10 should the frame 20 ever be rotated or tipped backwards more than 90 degrees from the horizontal position shown in FIGS. 1 and 2.

Figure 5:
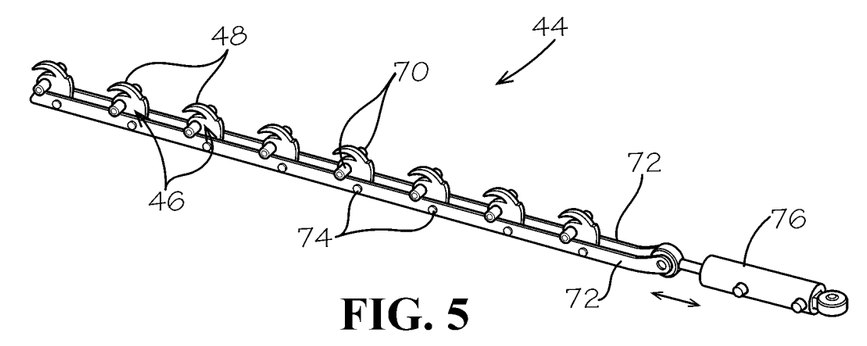
FIG. 5 is a perspective view of a hooking mechanism used in the bale splitter apparatus of FIG. 1.

FIG. 5 is a perspective view of a hooking mechanism 44 in isolation that can be installed within the hook tube 40 of the bale splitting apparatus 10, as described above. The hooking mechanism 44 can comprise a plurality of hook plates 46 that are each rotatably supported on bearings or journals 70 within the hook tube 40. Each of the hook plates 46 generally includes a hook 48 in an upper portion and an aperture in a lower portion that receives a pin 74 which also extends through apertures formed through one or more adjacent actuation bars 72. The actuation bars 72 can be coupled to a linear actuator 76 that is located at one end of the hook tube. In one aspect the linear actuator 76 can be another hydraulically-operated power cylinder that has been sized to fit fully or partially within one of the side frames 24.

The embodiment of the hooking mechanism 44 shown in FIG. 5 has eight hook plates 46 that are substantially evenly distributed along the length of the hooking mechanism 44 to provide eight separate and evenly-spaced points of attachment along the length of the lower surface of the bale. Nevertheless, it will be appreciated that the configuration of the hooking mechanism 44 is not limited to that shown in the drawing, and that other embodiments of the hooking mechanism are also possible and considered to fall within the scope of the present disclosure. By way of non-limiting examples, for instance, the hooking mechanism 44 can include more or fewer hook plates, hook plates 46 having a different shape (especially for the hooks 48 that are rotated into the bale) to better accommodate a particular type of forage material, or variations in the spacing between hook plates along the length of the hooking mechanism that can be applied accordance with particular needs, and the like.

Figure 6A:
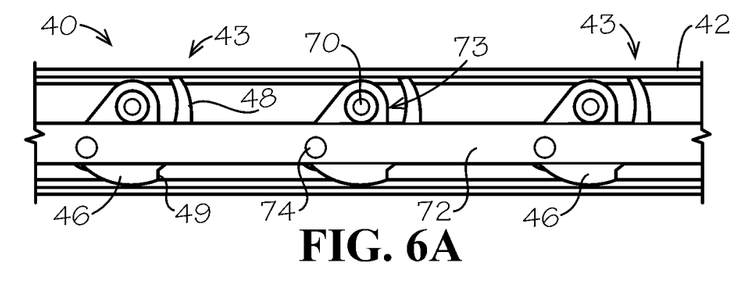
FIGS. 6A-6C are close-up, cross-sectional side views of a portion of the hooking mechanism of FIG. 5 with the hooks in retracted, partially extended, and fully engaged positions, respectively.
Figure 6B:
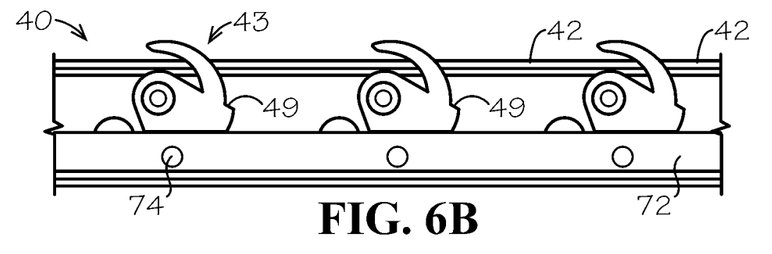
Figure 6C:
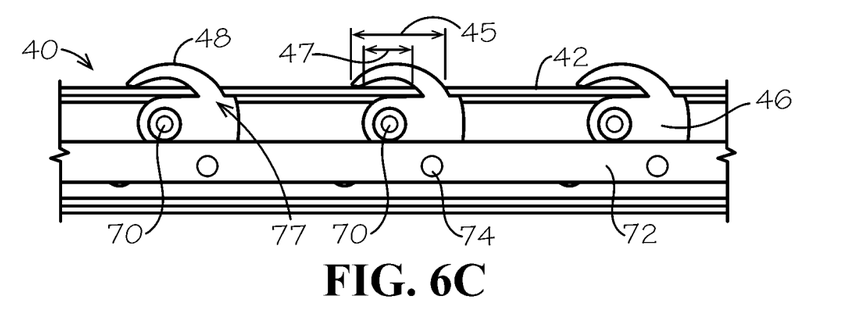

As illustrated in FIGS. 6A-6C, the apertures in the hook plates 46 that receive the pins 74 can be radially offset from the journals 70 that rotatably support each of the hook plates 46 between the side walls of the hook tube 40. This can create a camming affect that causes all of the hooks 48 to simultaneously sweep upward through the apertures 43 in the top plate 42 of the hook tube 40 when the linear actuator 76 is activated to pull in or withdraw the actuation bars 72, as illustrated in FIG. 6B. The pointed tips of the hooks 48 can easily penetrate through the wrap and forage of the bale. Continued withdrawal of the actuation bars 72 by the linear actuator 76 can cause the hooks 48 to arc over and downward through the forage of the bale until stop edges 49, formed into each hook plate 46 proximate the root of the hook 48, contact the underside of the top plate 42. This can create a positive stop that prevents further rotation of the hook plates 46 even as pressure is maintained by the linear actuator 76 to lock the hooks in place.

As shown in FIG. 6C, all the bale material (wrap and forage) that was initially located within the swept length 45 of a hook 48 is captured and compressed into the reduced volume 47 located under the hook 48 in its fully extended position. In situations where the bale wrap is a plastic sheet, the rotation of the hooks upward into the bale (FIG. 6A) first punctures the sheet, after which the compression of the forage against the inside surface of the wrap can act to distribute the clamping force across a larger surface area to prevent the wrap from tearing further. In situations where the bale wrap is a netting, individual strands of the netting may or may not be captured within the reduced volumes 47 under each of the hooks. Even if the strands are not physically captured within the reduced volumes 47, however, the compression of the adjacent forage that is captured within the reduced volumes 47 can still act to hold the netting strands that fall between the hooks 48 against the upper plate of the hook tube. Thus, the hook tube 40 with its internal hooking mechanism 44 can reliably capture and secure a wide range of wrap materials and configurations along the length of the bale and hook tube while simultaneously reducing the likelihood of tearing the wrap or missing capturing the wrap altogether. This can be advantageous over prior art clamping devices that merely pinch or clamp the wrap at a single location along the length of the bale.

In addition, the percentage of the length of the bale that is swept by the plurality of hooks can comprise a substantial percentage of the total length of the bale. For instance, in one aspect the swept lengths 45 of the plurality of curved hooks 48 can combine together to define a total swept length that is at least 20% of the length of the bale, while in a preferred embodiment the total swept length may be greater than 30% of the length of the bale.

FIG. 7 is a side view of the bale splitting apparatus 10 illustrating a general-purpose capability for receiving and splitting differently-sized cylindrical bales 2, 2A and 2B. Generally, the larger size bales 2 can be about five feet (60 inches) in diameter 6 and about five feet (60 inches) in length along the center axis 5, while the smaller bales 2A, 2B can be about four feet (48 inches) in diameter 6A and about three feet (36 inches) in diameter 6B, respectively. Although in a preferred embodiment the bale splitter 10 is sized with a width 21 (FIG. 1) between side frames 24 of about 63 inches to receive the five foot length of the larger size bale 2, and with the cutting arm 50 configured to rotate open far enough to accept its five foot diameter, it will be appreciated that the dimensions of the bale splitter can be altered as needed to accommodate differently-sized or differently-shaped bales.

Regardless of the size of the bale 2, the inner and outer support plane 33, 39 defined by the inner framework and tines of the cradle 30, respectively, can operate to substantially center the bale 2 above the inverted apex 31 of the cradle 30 prior to activation of the cutting arm 50, thereby positioning the bale 2 for a preferred cutting stroke. After activation of the hooking mechanism in the hook tube 40 to secure the wrap 8 at a lower angular location 7 that extends across the underside or lower portion of the bale 2, the powering system can then be activated to pressurize the power cylinders 62 and cause the elongate blade 52 to rotate downward to cut through the wrap 8 at an upper angular location 9 that extends across the top of the bale 2. In one aspect the lower angular location 7 and the upper angular location 9 can be separated from each other by 135 degrees or more, and in preferred embodiment can be separated from each other by 150 degrees or more.

After cutting through the wrap at the top of the bale 2, the elongate blade 52 can continue to rotate downward through the forage 4 of the bale along cutting path 51 that, in one aspect, can arc around and forward of the center axis 5 of the bale before curving back toward the apex 31 of the cradle 30. With the larger bales 2 this can split the bale into two unequal halves of about 45% (forward half) and 55% (rearward half), while the smaller bales 2A, 2B this inequality an increase to about 40%-60% or about 35%-65%, respectively. It has been found that configuring the cutting path 51 of the elongate blade 52 to sweep forward of the center axis 5 of the bale 2 can effectively split the bale into large portions while advantageously avoiding the more dense material at the core of the bale, thereby reducing the loads and stresses acting on various components of the bale splitter 10.

Figure 8:
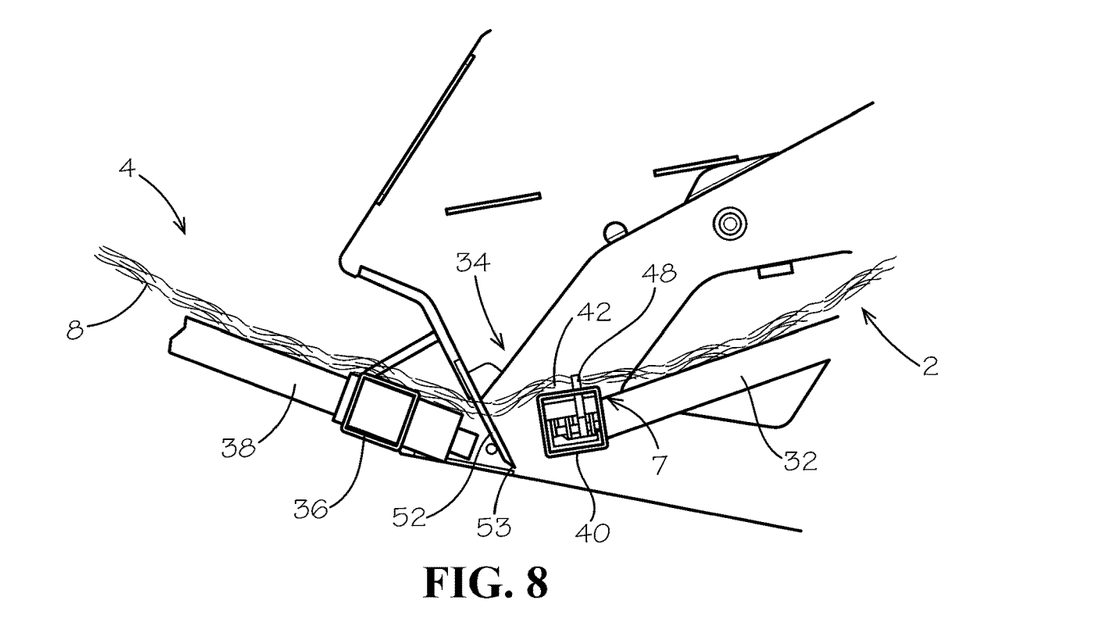
FIG. 8 is a close-up side view of the cutting blade of the bale splitter apparatus of FIG. 1 in the closed position.

FIG. 8 is a close-up side view of the cutting blade 52 when the cutting arm 50 has reached its fully-closed position with the hard stop 57 abutting the top plate 42 of the hook tube 40, as shown in FIG. 2. In this position the points of the serrated cutting edge 53 can penetrate clear through the bale wrap 8 on the bottom side of the bale 2, while the root portions of the serrated cutting edge 53 can remain within the bale. Because there is some compression and downward bowing of the forage in front of the cutting blade 52 prior to being cut by the diagonal cutting edges of the serrated blade 52, it has been discovered that most of the thin layer of forage that this secured with the wrap 8 will remain uncut while nearly all of the forage that is interior to this thin layer is cut and left unsupported to fall out of the bale splitter 10 during a dumping step. In this way the bale splitter 10 can capture and retain as much additional forage with the hook tube 40 as needed to reliably capture and retain the wrap, while ensuring that the remainder of the forage in the bale is properly cut for dumping and distribution on the ground surface.

In accordance with another representative embodiment of the present disclosure, one method of cutting a wrapped cylindrical bale 102 of forage 104 with a bale splitting apparatus 110 is illustrated in FIGS. 9-14. The bale splitter 110 is generally mounted to the lift arms 184 of a lift vehicle 180, such as a front end loader, with the back side of the frame 120 being coupled to the front portions of the lift arms 184. For a hydraulically-operated powering system, both the linear actuator of the hook tube 140 and the power cylinders that drive the rotating cutting arm 150 can also be connected to the hydraulic system of the lift vehicle 180 through high pressure hydraulic fluid transfer lines 188. As known to one of skill in the art, the lift arms 188 are generally configured to lift and rotate the bale splitter 110 in the space in front of the lift vehicle under the control of an operator located within the cab of the lift vehicle, and who can also operate a system of one or more control valves to actuate the linear actuator that engages the hooking mechanism in the hook tube 140 and to activate the power cylinders that drive the cutting arm 150.

For example, in one aspect both the power cylinders and the linear actuator can be actuated on the same hydraulic system using a single control mechanism. In this embodiment a sequential control valve be included within the hydraulic system to automatically operate the linear actuator and engage the hooking mechanism simultaneous with pressure being applied to the power cylinders, and to automatically disengage the hooking mechanism and release the netting or wrap once the cutting arm returns to its fully open position. Alternatively, the power cylinders and the linear actuator may be actuated on different hydraulic systems with independently operated control mechanisms.

Figure 9:
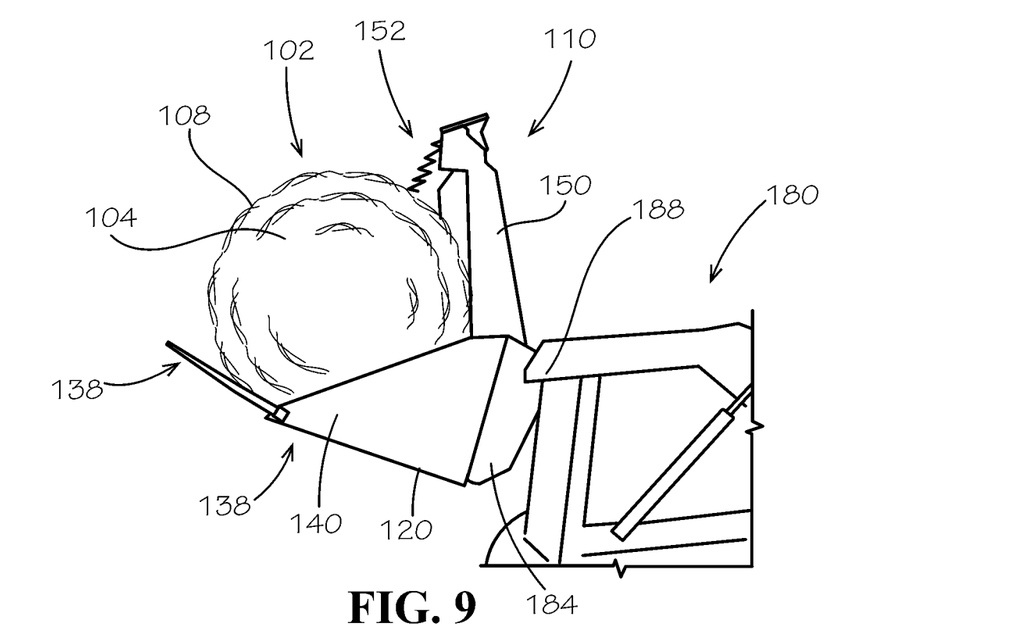
FIGS. 9-14 illustrate a method of cutting a wrapped cylindrical bale of forage with a bale splitter apparatus, in accordance with another representative embodiment of the present disclosure.

As shown in FIG. 9, the lift vehicle 180 can be operated to first pick up a bale 102 with the tines 138 projecting from the front tube 136 of the frame 120, and then to lift and rotate the bale splitter 110 and bale 102 slightly backwards so that bale is centered within the shallow cradle 130 formed by the tines 138 and the internal framework of the frame 120 between the side frames 124. Once the weight of the bale 102 is bearing down on the cradle 130 to firmly press the wrap 108 against the top plate of the hook tube 140, the liner actuator of the hooking mechanism can be activated to capture and secure the wrap by sweeping the plurality of hooks upward through the holes in the top plate and into the outer layers of the bale. It will be appreciated by the skilled artisan that hooking the wrap 108 and forage 104 with a hooking mechanism positioned underneath the bale 102 and extending upward through the top plate of the hook tube 140 can result in a more secure and reliable capture of the wrap by the bale splitter 120 than with the clamping mechanisms currently available in the art.

For example, clamping mechanisms with jaws that open and shut generally cannot be placed under the lower portions of the bale because the weight of the bale bearing against the upper jaw can prevent the jaws from opening properly. And even when the clamp is located adjacent the side of the bale, the action of opening the jaws can often push the wrap away from the clamping mechanism so that only portions of the wrap are grabbed by the jaws upon closing. This can result in a partial or incomplete capture of the wrap, which may then tear away during the dumping steps so that manual removal of the wrap from the forage is still required. Worse, any tearing of the wrap can potentially result in small separate pieces of wrapping material becoming intermingled with and contaminating the forage.

The hook tube 140 of the present disclosure with its internal hooking mechanism can overcome these deficiencies because the weight of the bale 102 can automatically position the wrap 108 in a preferred position for capture, while the action of the multiple hooks sweeping upward through the wrap and forage does not inherently disturb or reposition the wrap material before it can be securely captured at multiple locations across the length of the bale. And as discussed above, the hook tube/hooking mechanism can be particularly effective when the wrap is a netting with strands spaced across the surface of the bale, rather than a continuous sheet, as the thin layer of captured forage material can function to hold the netting strands that fall between the hooks against the upper plate of the hook tube.

Figure 10:
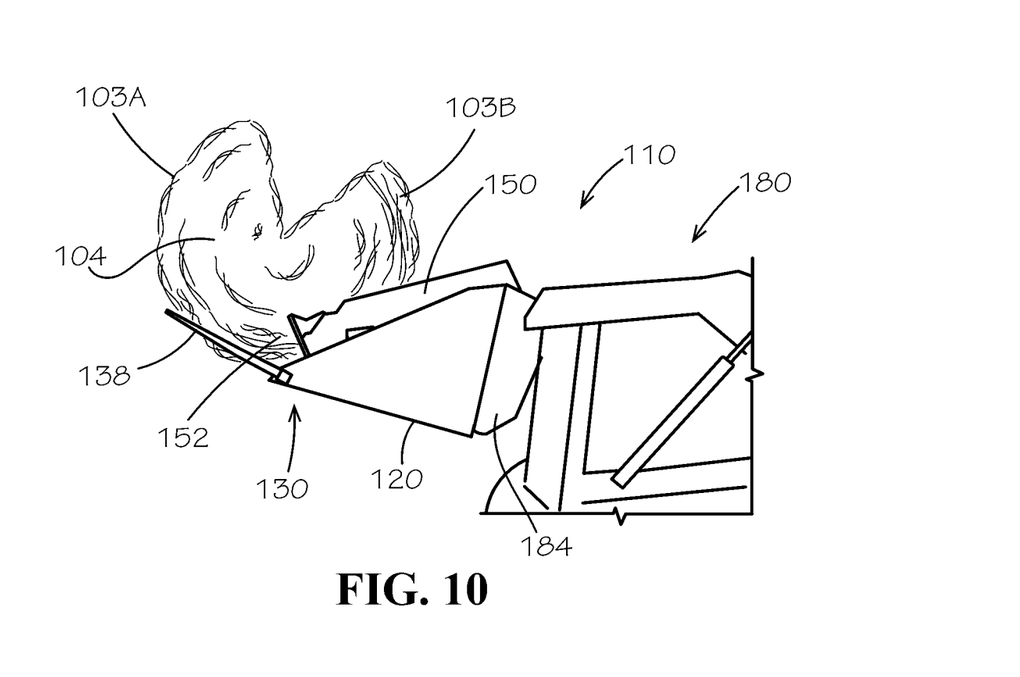

Once the hooking mechanism has been engaged and the wrap has been retained or captured along the length of the underside of the bale 102, the power cylinders can be activated to drive the elongate blade 152 with the cutting edge 153 downward through the center portion of the bale 102, as shown in FIG. 10. Because the cylindrical bales are typically formed with spirally-wound forage 104 that gradually dries to create internal tensile forces within the layered bands of forage material, cutting through the center portion of the bale severs the bands to allow the two halves 103A, 103B or portions of the bale to naturally pull apart as they split open.

Figure 11:
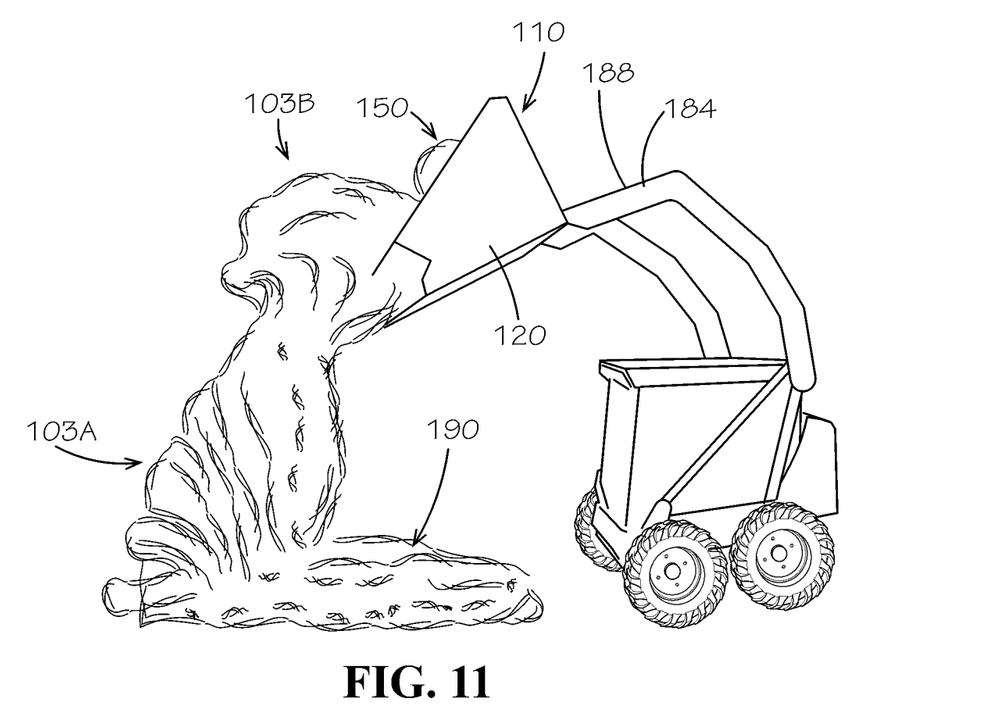
Figure 12:
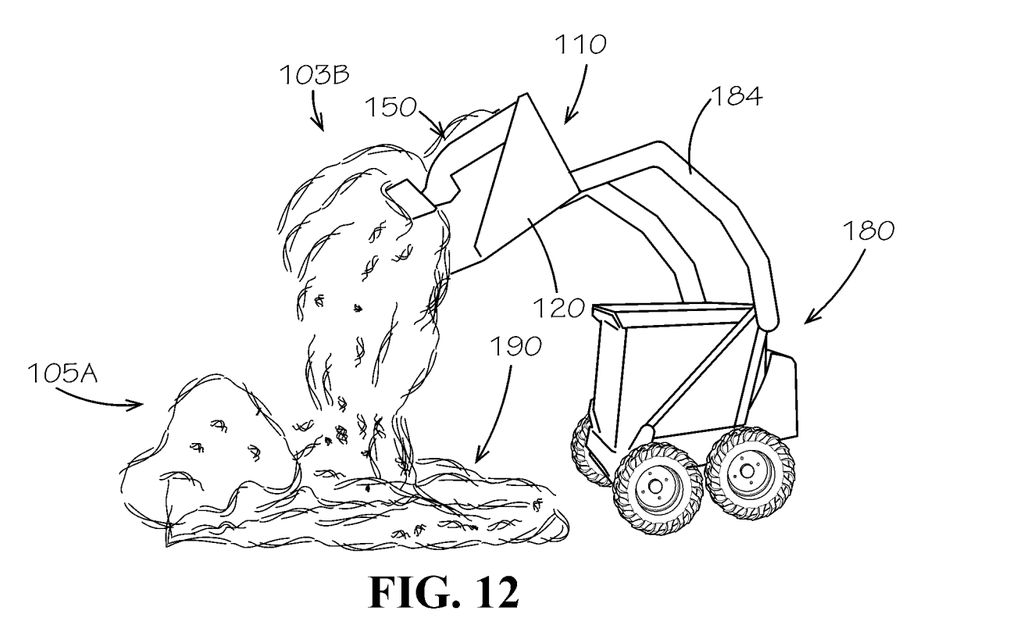
Figure 13:
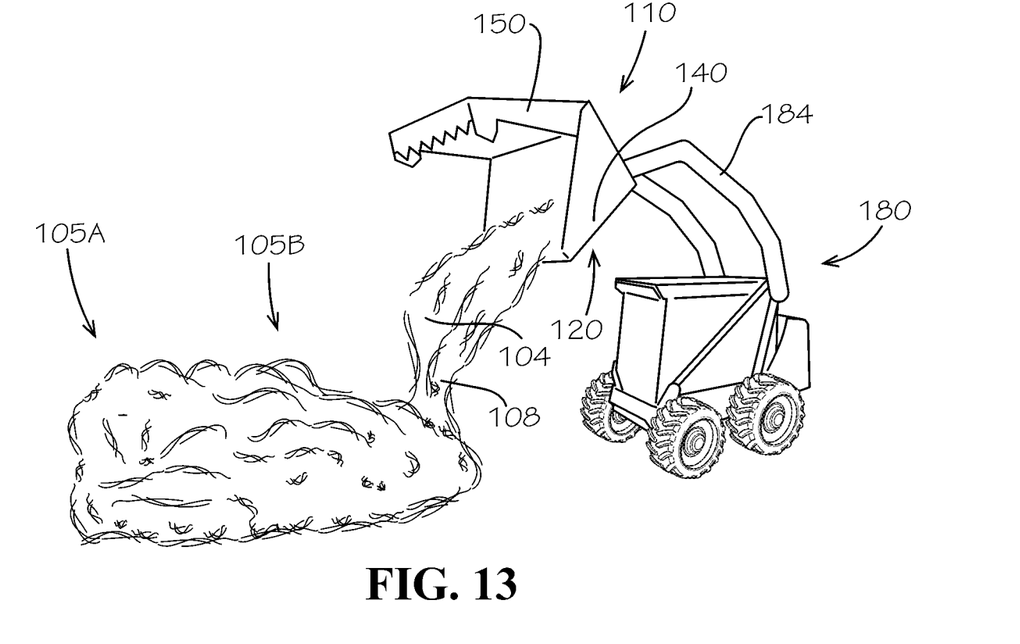

As illustrated in FIG. 11, the lift arms 184 can raise the bale splitter 110 upward after the bale 102 is cut and tilt it forwards to dump the forward half 103A of the split bale down onto the ground surface 190 to form a first pile 105A (FIG. 12). In one aspect this can initially be performed with the cutting arm 150 remaining in its downward, fully-closed position so that at least a portion of the rearward split half 103B is retained within the bale splitter by the inside surface of the blade support. After dumping the forward half 103A of the split bale, the lift vehicle can be moved and the cutting arm 150 raised to dump the rearward half 103B down onto the ground surface and form a second pile 105B adjacent to, or spaced from, the first pile 105A (FIGS. 12-13). Moving the lift vehicle while dumping the split bale can better distribute the forage material over the ground surface and make it more accessible for feeding livestock and other animals. Of course, the operator is not limited to this particular forage release or dumping procedure, and can raise the cutting arm 150 at any point after cutting to completely releasing the cut and loosed forage to fall onto the ground surface.

Figure 14:
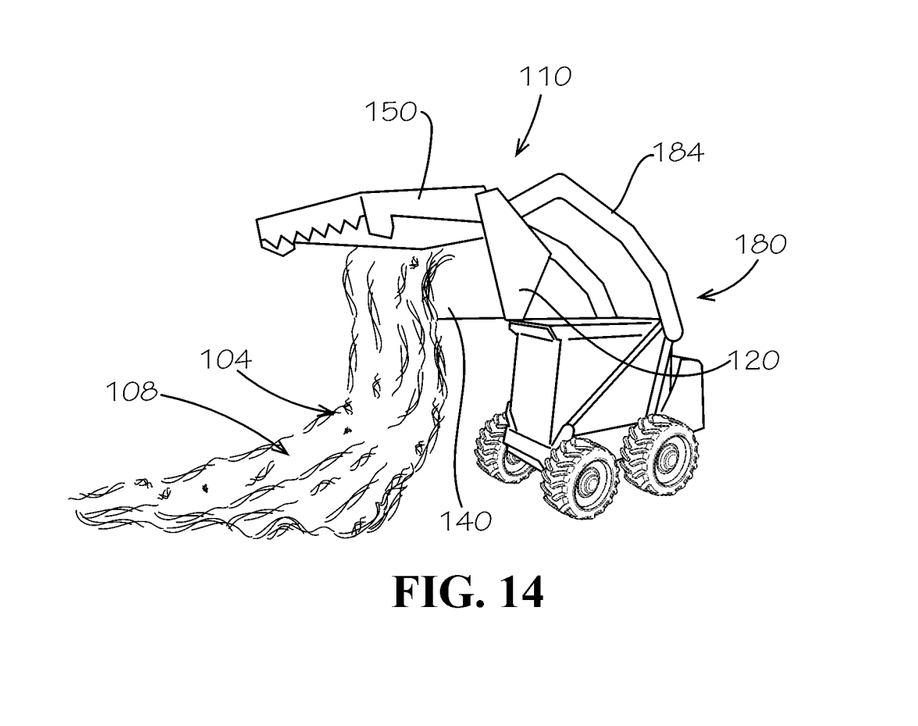

Once the cut and loosed forage is released to fall onto the ground surface, the wrap 108 and the thin layer of captured forage 104 remains attached to the frame 120 of the bale splitter 110 by the hook tube 140 (FIG. 13). The linear actuator of the hooking mechanism can then be operated in the reverse direction to retract the hooks back below the top plate of the hook tube, allowing the wrap 108 and captured forage 104 to drop or to be pulled off the frame 120 (FIG. 14). As the wrap 108 remains one continuous band of material, it can be easily removed manually from the remainder of the forage that was also captured by the hooking mechanism and safely removed form the feeding area.

As indicated above, the invention has been described herein in terms of preferred embodiments and methodologies considered by the inventor to represent the best mode of carrying out the invention. It will be understood by the skilled artisan, however, that a wide range of additions, deletions, and modifications, both subtle and gross, may be made to the illustrated and exemplary embodiments of the composite substrate without departing from the spirit and scope of the invention. For example, the shape of the elongate blade could be modified to lengthen or shorten the serrations, or to remove the serrations altogether and form an elongate blade having a straight or curved shape, and the like. The mounting locations of the cutting arm and power cylinders could also be relocated elsewhere on the frame, and the orientation of the power cylinders could also be reversed. These and other revisions might be made by those of skill in the art without departing from the spirit and scope of the invention that is constrained only by the following claims.

What is claimed is:

1. An apparatus for splitting wrapped bales of forage and retaining wrap, each bale being of a length and a diameter and defining a center axis, the apparatus comprising:
   a frame including an interior framework oriented at an obtuse angle relative to a plurality of tines projecting forwardly from the frame, the interior framework and tines together defining an upwardly-opening cradle that supports and centers a bale of forage bound with a wrap above an inverted apex of the cradle;
   an elongate hooking mechanism extending laterally across the underside of the bale and configured to capture the wrap together with a thin layer of forage;
   an elongate blade rotatably supported on the frame and configured to rotate downward through the bale toward the inverted apex of the cradle;
   a first actuation device that activates the elongate hooking mechanism to capture the wrap and the thin layer of forage; and
   a second actuation device that rotates the elongate blade downward to cut through the forage and split the bale,
   wherein the elongate hooking mechanism further comprises a hook tube having a plurality of curved hooks that sweep upward, over, and downward through the bale to capture the thin layer of forage along the length of the bale.

2. The apparatus of claim 1, wherein the elongate hooking mechanism extends across the length of the bale to capture the wrap and the thin layer of forage along the length of the bale.

3. The apparatus of claim 1, wherein the swept lengths of the plurality of curved hooks combine together to define a total swept length that is at least 20% of the length of the bale.

4. The apparatus of claim 1, wherein the total swept length is at least 30% of the length of the bale.

5. The apparatus of claim 1, wherein the obtuse angle is at least 130 degrees.

6. The apparatus of claim 1, wherein an upper angular location where the wrap is cut by the elongate blade is angularly spaced from a lower angular location where the elongate hooking mechanism captures the wrap by at least 135 degrees.

7. The apparatus of claim 1, wherein a cutting path of the elongate blade sweeps forward of the center axis of the bale.

8. The apparatus of claim 7, wherein the bale is split into unequal halves with a forward half being less than a rearward half.

9. The apparatus of claim 1, wherein a back end of the frame is configured for attachment to the lifting arms of a lift vehicle.

10. An apparatus for splitting wrapped bales of forage and retaining wrap, each bale having a length and a diameter and defining a center axis, the apparatus comprising:
    a rotatable frame including an interior framework oriented at an angle relative to a plurality of tines projecting forwardly from the frame, the interior framework and tines together defining an upwardly-opening cradle that supports and centers a bale of forage bound with a wrap above an inverted apex of the cradle;
    an elongate hooking mechanism extending laterally across the length of the underside of the bale and configured to capture the wrap together with a thin layer of forage along the length of the bale;
    an elongate blade rotatably supported on the frame and configured to rotate downward through the bale toward the inverted apex of the cradle;
    a first actuation device that activates the elongate hooking mechanism to capture the wrap and the thin layer of forage; and
    a second actuation device that rotates the elongate blade downward to cut through the forage and split the bale,
    wherein the elongate hooking mechanism further comprises a hook tube having a plurality of curved hooks that sweep upward, over, and downward through the bale to capture the thin layer of forage along the length of the bale.

11. The apparatus of claim 10, wherein the interior framework is oriented at an obtuse angle relative to a plurality of tines projecting forwardly from the frame.

12. The apparatus of claim 11, wherein the obtuse angle is at least 130 degrees.

13. The apparatus of claim 10, wherein the swept lengths of the plurality of curved hooks combine together to define a total swept length that is at least about 20% of the length of the bale.

14. The apparatus of claim 10, wherein an upper angular location where the wrap is cut by the elongate blade is angularly spaced from a lower angular location where the elongate hooking mechanism captures the wrap by at least 135 degrees.

15. The apparatus of claim 10, wherein a cutting path of the elongate blade sweeps forward of the center axis of the bale so that the bale is split into unequal halves, with a forward half being less than a rearward half.

16. The apparatus of claim 10, wherein a back end of the frame is configured for attached to the lifting arms of a lift vehicle.

* * * * *